H. W. DOVER
HAND WHEEL
APPLICATION FILED JULY 16, 1919.
1,331,326.
Patented Feb. 17, 1920.
2 SHEETS—SHEET 1.
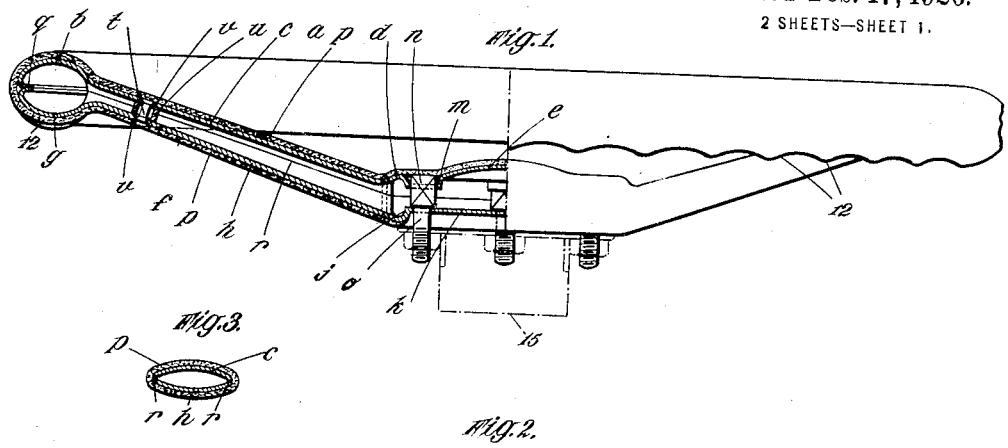
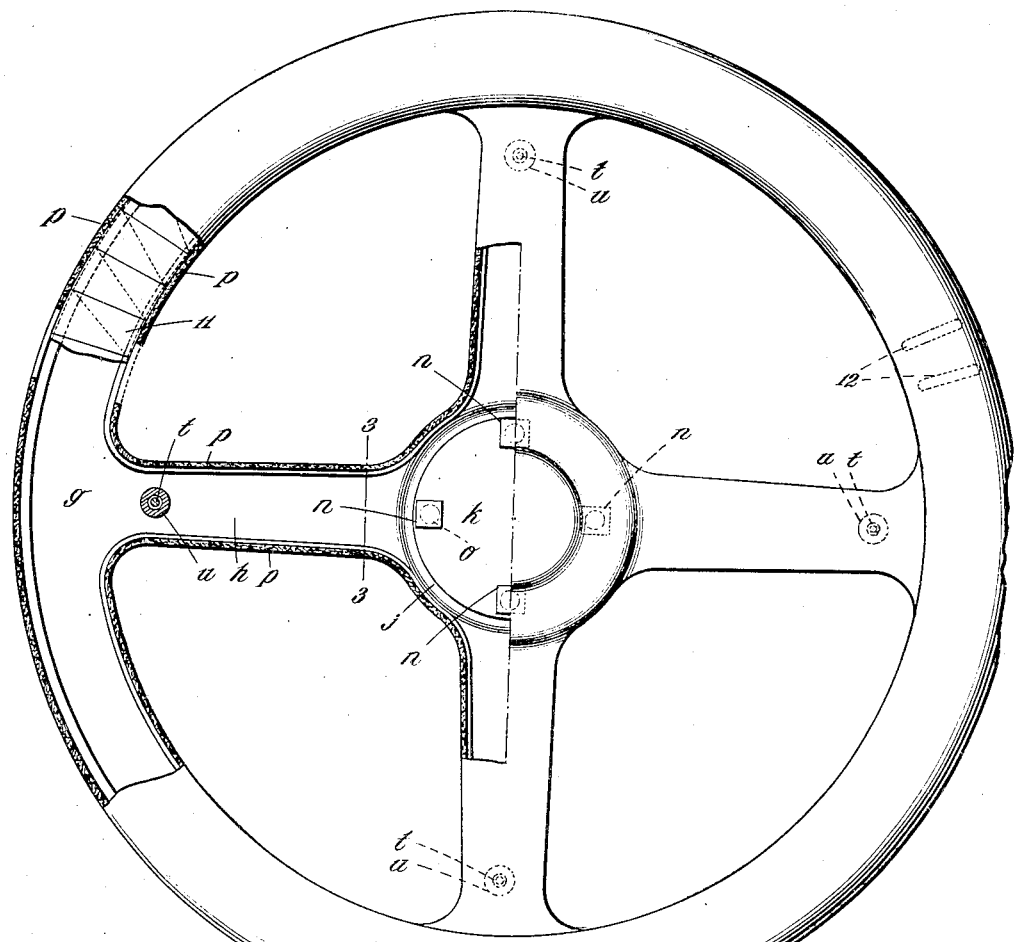
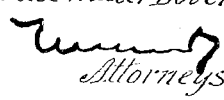
Inventor
Horace Walter Dover
By
Attorneys

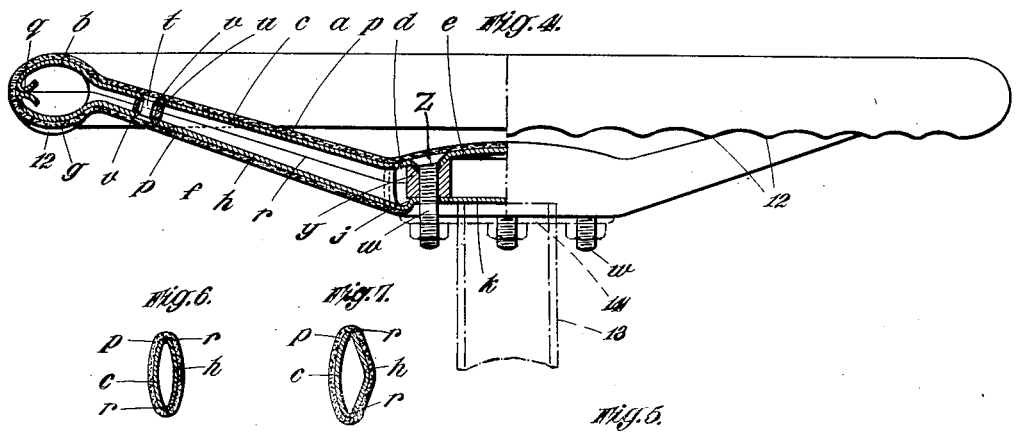
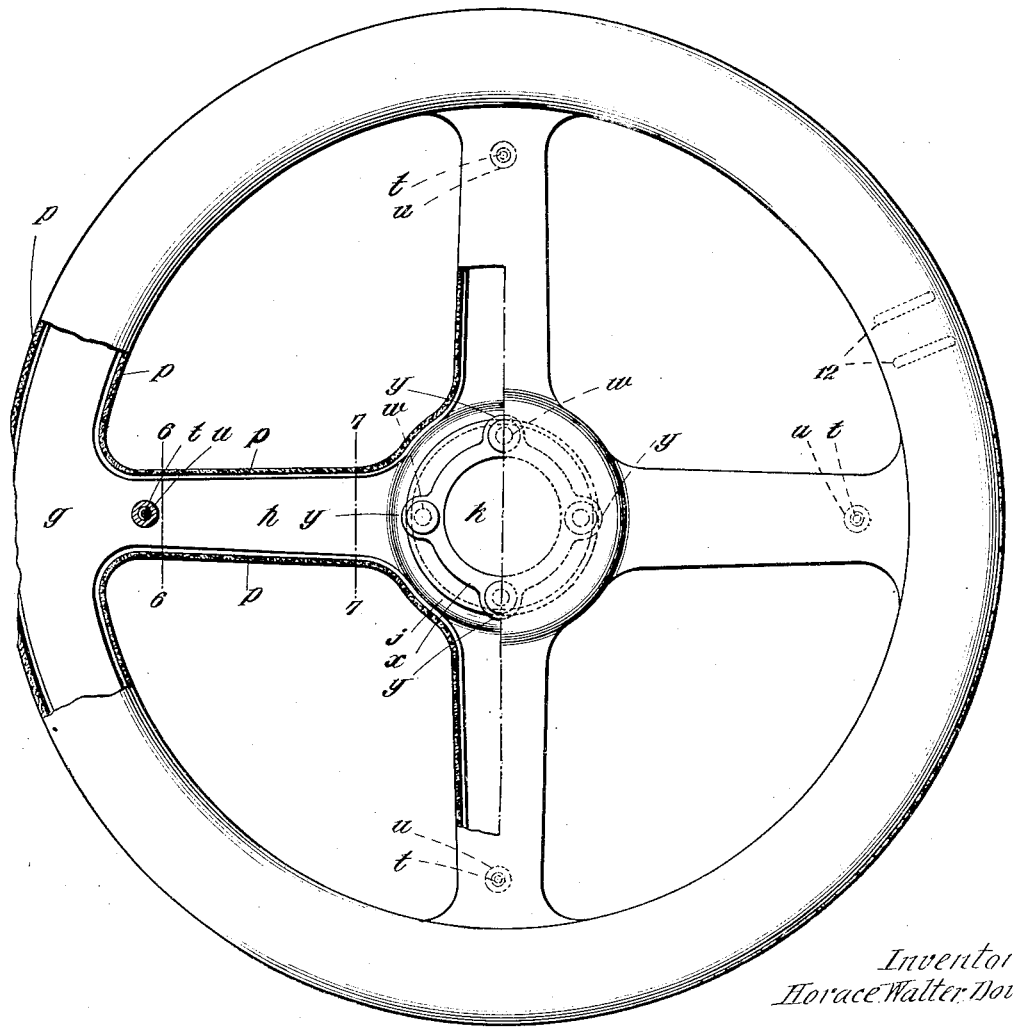

UNITED STATES PATENT OFFICE.

HORACE WALTER DOVER, OF NORTHAMPTON, ENGLAND.

HAND-WHEEL.

1,331,326.  Specification of Letters Patent.  Patented Feb. 17, 1920.

Application filed July 16, 1919. Serial No. 311,159.

*To all whom it may concern:*

Be it known that I, HORACE WALTER DOVER, a subject of the King of Great Britain, and resident of Holyrood, St. James End, Northampton, in the county of Northampton, England, have invented certain new and useful Improvements in or Relating to Hand-Wheels, of which the following is a specification.

This invention which relates to hand wheels, such for instance as are employed for steering motor vehicles, for the operation of stop cocks, controlling aircraft, motor boats, gun mechanism, and for other purposes, constitutes a modification of the invention described and claimed in the specification of my prior Letters Patent No. 1,294,885.

In the preferred form of the invention described and illustrated in the specification of my said prior Letters Patent each of the two halves of the wheel is formed with a half nave and the complete nave portion, resulting from the superposition of the one half upon the other, is secured to a flange on a hub by means of rivets the top and bottom of said hub passing through circular apertures at the centers of the two halves. Inasmuch as the size of the steering pillar or other spindle on to which the hand wheel is to be fitted may vary considerably, and inasmuch as the method of attachment of the hand wheel to such steering pillar or other spindle may also be subject to many variations it follows that the hand wheel as a whole, which includes the hub, can only be completed when the design and size of the hub are known.

The object of the present invention is to provide an improved construction of hand-wheel of this kind capable of being produced as a whole, irrespective of the size of the steering pillar or other spindle to which it is to be fitted and irrespective of the type of hub fitting which may be required.

According to the present invention the upper half of the wheel is formed of stamped or pressed sheet metal which extends completely over or across the central or nave portions of the wheel and has secured thereto bolts or like means of attachment which pass through apertures in and project below the lower half, whereby the complete wheel may be secured to a steering pillar or other spindle or to a hub or the like.

The lower half of the wheel may also be formed of stamped or pressed sheet metal which extends over or across the central or nave portion of the wheel or the lower half of the rim, the lower part of each spoke, and the lower part of the nave of the wheel including a central portion may be of cast metal but in any event the parts may be assembled and covered irrespective of the size of the steering pillar or the like or the type of hub as a hub or other fitting may be readily attached to the completed wheel.

The invention is illustrated by the accompanying drawings wherein Figure 1 is a side view and Fig. 2 a part plan view of one form of the improved wheel, while Fig. 3 is a section on the line 3—3 of Fig. 2. Those parts of Figs. 1 and 2 which are to the right of the center line are shown in elevation and plan respectively, while those parts to the left of the same line are shown either wholly or partly in section.

Figs. 4 and 5 are similar views to Figs. 1 and 2, but showing a modification of the invention, while Figs. 6 and 7 are cross sections on the lines 6—6 and 7—7, respectively, of Fig. 4.

Referring particularly to Figs. 1 to 3 $a$ is a stamping constituting the upper half of the wheel, and is formed with an annular rim-portion $b$, a plurality of half-spokes $c$, and a half nave $d$ which extends completely over or across the central portion of the wheel as at $e$. $f$ is a stamping constituting the lower half of the wheel, and is formed with portions $g$, $h$, $j$ and $k$ corresponding respectively with the portions $b$, $c$, $d$ and $e$ of the stamping $a$, so that the two stampings, when superposed the one upon the other, together form a wheel whereof both the rim and the spokes are elliptical in cross section.

At their inner ends, the upper and lower halves $c$ and $h$ of the spokes merge into the upper and lower halves $d$ and $j$ of the nave of the wheel and at their outer ends they merge into the upper and lower halves $b$ and $g$ of the rim.

The central portion $e$ is pierced and pressed in as at $m$ for the passage therethrough of the elongated square heads $n$ of the bolts $o$ the central portion $k$ being correspondingly pierced for the passage therethrough of the shanks of said bolts. The heads $n$ of the bolts $o$ are of such length in the direction of their axes that when the shoulder at the junction of the head and shank of a bolt rests upon the upper side of the central portion $k$ the top of said head will be substantially flush with the upper side of the central portion $e$.

After the two halves of the wheel and the bolts $o$ are assembled the whole, with the exception of the central portion $k$ of the lower stamping $f$, is incased in a casing $p$ of moldable material applied according to any of the well-known methods of manufacture, the casing serving the two-fold purpose of retaining two stampings together and of giving a handsome finish to the wheel. The words "moldable material" wherever referred to in the specification and the annexed claims are intended to include material such as celluloid, exonite, or similar material or a non-inflammable material capable of being molded in a similar manner.

If desired, the marginal parts of the rim and spoke portions in the two stampings may be inturned so as to seat the one upon the other and strengthen the structure; the marginal parts of the rim portion being shown as inturned at $q$ in Fig. 1, whereas in Figs. 1 and 3, the spoke portions of the two stampings are shown as butt jointed one against the other at $r$.

The outer ends of the spoke portions $c$ and $h$ may be united by rivets $t$ . . . passing through apertured distance pieces $u$ . . . Preferably the distance pieces $u$ . . . are countersunk and the portions $c$ and $h$ are apertured to give passage to the shank portions of the rivets $t$ . . . so that when the rivets are closed the margins of the portions $c$ and $h$ around the rivet holes are drawn into the countersunk holes in the distance pieces $u$ . . . as at $v$, Fig. 1 and the heads of the rivets are flush with the surfaces of the portions $c$ and $h$.

The modified construction shown in Figs. 4 to 7 is substantially the same as that illustrated in Figs. 1 to 3, like reference letters indicating like parts in both forms of the invention. The principal difference lies in the means for securing the portions of the wheels together at the nave; it is to be observed however that the marginal parts of the rim portion are more inturned at $q$ than in the form of the invention shown in Figs. 1 to 3, while the lower spoke portion $h$ changes from semi-elliptical to substantially V cross section as the nave of the wheel is approached.

The central portions $c$ and $h$ are apertured to give passage to bolts $w$ . . . each threaded at its opposite ends leaving a plain portion to constitute a shoulder adapted to bear against the underside of the central portion $h$. Between the portions $c$ and $h$ is disposed an annular distance piece $x$ formed with apertured lugs $y$ . . . to give passage to the bolts $w$ . . . and with an upper surface conforming with the configuration of the central portion $e$. Each of the apertures in the lugs $y$ . . . is countersunk at its upper end and in the assembling of the parts the head of each bolt $w$ is riveted over and presses the margin of the aperture in the upper portion of the wheel into the countersunk hole as at $z$, the rivet head being made flush with the surface of said portion.

In some cases and in either form of the invention the upper and lower portions of the rim, or those of both the rim and the spokes, may be secured together by first wrapping them spirally with a tape 11 of linen or other fabric, after which the moldable material may be applied as above mentioned.

The underside of the rim portion of the casing of the wheel may be formed, when molded, with a plurality of ribs 12 leaving indentations or finger gaps to facilitate the gripping of the wheel by the user, but I make no claim to this feature.

The bolts $o$ . . . or $w$ . . . serve for attachment of the complete wheel to the end of a spindle, such as a steering pillar 13 shown in dot and dash lines in Fig. 4, in cases where a flange is provided, such as is indicated at 14 or to a hub fitting such as is indicated at 15 in dot and dash lines in Fig. 1 provided with such a flange, in cases where it is desired that a hub shall be employed. It will be seen, therefore, that the improved hand wheel is capable of being produced as a whole, irrespective of the size of the steering pillar or other spindle to which it is to be fitted and irrespective of the type of hub fitting which may be required.

I claim:—

1. In a two-part hand-wheel, a stamped rim, spoke and nave upper half; a rim spoke and nave lower half; the nave portion of said upper half extending completely over the central portion of the wheel; bolts secured to said upper half and passing through apertures in and projecting below the lower half; and a casing of moldable material around said upper and lower halves.

2. In a two-part hand-wheel, a stamped rim, spoke and nave upper half; a stamped rim, spoke and nave lower half; the nave portions of said halves extending completely across the central portion of the wheel; bolts secured to the nave portion of said upper half; the nave portion of said lower half being formed with apertures through which said bolts pass and project below said lower half; and a casing of moldable material around said upper and lower halves.

3. In a two-part hand-wheel, a stamped rim, spoke and nave upper half; a stamped rim, spoke and nave lower half; the nave portions of said halves extending completely across the central portion of the wheel, and being formed with apertures; an apertured distance piece disposed at the nave of the wheel between said upper and lower halves; bolts having shoulders intermediate of their ends, said bolts passing through the apertures in said nave portions and in said distance piece the shoulders on said bolts engaging the under side of the lower half of the wheel; rivet heads on said bolts holding said upper half to said distance piece; and a casing of moldable material around said upper and lower halves.

4. In a two-part hand-wheel, a stamped rim, spoke and nave upper half; a stamped rim, spoke and nave lower half; the nave portions of said halves extending completely across the central portion of the wheel and being formed with apertures; an apertured distance piece disposed at the nave of the wheel between said upper and lower halves, the apertures being countersunk at the upper side of said distance piece; bolts having shoulders intermediate of their ends, said bolts passing through the apertures in said nave portions and in said distance piece, the shoulders on said bolts engaging the underside of the lower half of the wheel, and the marginal portions of the nave portion of the upper half around the apertures therein being pressed down into the countersunk holes at the upper side of the distance piece; rivet heads on said bolts holding said upper half to said distance piece, said rivet heads being flush with the upper surface of the nave portion of said upper half; and a casing of moldable material around said upper and lower halves.

5. In a two-part hand-wheel, a stamped rim, spoke and nave upper half; a stamped rim, spoke and nave lower half; the spoke portions of said halves being apertured near their outer ends and the nave portions of said halves extending completely across the central portion of the wheel; bolts secured to the nave portion of said upper half, the nave portion of said lower half being formed with apertures through which said bolts pass and project below said lower half; apertured distance pieces disposed, in said spoke portions between said upper and lower halves, the apertures in said distance pieces being countersunk; rivets passing through the apertures in said spoke portions and in said distance pieces, the marginal portions of the spoke portions of the upper and lower halves around the apertures therein being pressed into the countersunk holes in said distance pieces; heads on said rivets holding said spoke portions to said distance pieces, said heads being flush with the surfaces of said spoke portions; and a casing of moldable material around said upper and lower halves.

6. In a two-part hand-wheel, a stamped rim, spoke and nave upper half; a stamped rim, spoke and nave lower half; the spoke portions of said halves being apertured near their outer ends and the nave portions of said halves extending completely across the central portion of the wheel and being formed with apertures; an apertured distance piece disposed at the nave of the wheel between said upper and lower halves, the apertures being countersunk at the upper side of said distance piece; bolts having shoulders intermediate of their ends, said bolts passing through the apertures in said nave portions and in said distance piece, the shoulders on said bolts engaging the underside of the lower half of the wheel and the marginal portions of the nave portion of the upper half around the apertures therein being pressed down into the countersunk holes at the upper side of the distance piece; rivet heads on said bolts holding said upper half to said distance piece, said rivet heads being flush with the upper surface of the nave portion of said upper half; apertured distance pieces disposed in said spoke portions between said upper and lower halves, the apertures in said last mentioned distance pieces being countersunk; rivets passing through the apertures in said spoke portions and in said last mentioned distance pieces, the marginal portions of the spoke portions of the upper and lower halves around the apertures therein being pressed into the countersunk holes in said last mentioned distance pieces; heads on said rivets holding said spoke portions to said last mentioned distance pieces, said heads being flush with the surfaces of said spoke portions; and a casing of moldable material around said upper and lower halves, substantially as set forth.

HORACE WALTER DOVER.